(12) United States Patent
Kurosawa et al.

(10) Patent No.: US 8,692,897 B2
(45) Date of Patent: Apr. 8, 2014

(54) METHOD OF GENERATING MOVING PICTURE INFORMATION

(75) Inventors: Takahiro Kurosawa, Tokyo (JP); Tomoaki Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/329,432

(22) Filed: Dec. 19, 2011

(65) Prior Publication Data

US 2012/0086820 A1   Apr. 12, 2012

Related U.S. Application Data

(63) Continuation of application No. 10/810,703, filed on Mar. 29, 2004, now abandoned.

(30) Foreign Application Priority Data

| | | |
|---|---|---|
| Mar. 31, 2003 | (JP) | 2003-097074 |
| Apr. 30, 2003 | (JP) | 2003-125334 |
| May 13, 2003 | (JP) | 2003-134021 |

(51) Int. Cl.
*H04N 5/232* (2006.01)
*H04N 7/18* (2006.01)

(52) U.S. Cl.
USPC ........................................ 348/211.8; 348/143

(58) Field of Classification Search
None
See application file for complete search history.

(56) References Cited

U.S. PATENT DOCUMENTS

| | | | |
|---|---|---|---|
| 5,581,362 A | 12/1996 | Sakaue et al. | |
| 5,986,695 A | 11/1999 | Choi | |
| 5,996,023 A | 11/1999 | Winter et al. | |
| 6,002,995 A | 12/1999 | Suzuki et al. | |
| 6,182,116 B1 * | 1/2001 | Namma et al. | 709/204 |
| 6,208,379 B1 | 3/2001 | Oya et al. | |
| 6,414,716 B1 | 7/2002 | Kawai | |
| 6,469,737 B1 | 10/2002 | Igarashi et al. | |
| 6,698,021 B1 | 2/2004 | Amini et al. | |
| 6,738,572 B2 | 5/2004 | Hunter | |
| 6,741,790 B1 | 5/2004 | Burgess | |
| 6,807,361 B1 | 10/2004 | Girgensohn et al. | |
| 6,999,613 B2 | 2/2006 | Colmenarez et al. | |
| 7,046,273 B2 | 5/2006 | Suzuki | |
| 2001/0010549 A1 | 8/2001 | Miyake | |
| 2002/0073214 A1 * | 6/2002 | Iinuma | 709/229 |
| 2002/0146238 A1 | 10/2002 | Sugahara | |
| 2002/0154070 A1 | 10/2002 | Sato et al. | |
| 2002/0175995 A1 | 11/2002 | Sleeckx | |
| 2002/0191080 A1 * | 12/2002 | Terada et al. | 348/207.1 |
| 2003/0078038 A1 | 4/2003 | Kurosawa et al. | |
| 2003/0093810 A1 | 5/2003 | Taniguchi | |
| 2003/0214582 A1 | 11/2003 | Takahashi et al. | |
| 2004/0109071 A1 | 6/2004 | Kido et al. | |
| 2004/0125877 A1 | 7/2004 | Chang et al. | |

FOREIGN PATENT DOCUMENTS

| | | |
|---|---|---|
| JP | 07-099605 A | 4/1995 |
| JP | 10-042185 A | 2/1998 |
| JP | 10-136247 A | 5/1998 |
| JP | 10-136345 A | 5/1998 |

(Continued)

*Primary Examiner* — Albert Cutler
(74) *Attorney, Agent, or Firm* — Fitzpatrick, Cella, Harper & Scinto

(57) ABSTRACT

A moving picture file is generated from moving picture data received from a camera. Control sequence information from the camera corresponding to the generated moving picture file, and information relating to an address of the camera, are incorporated into the moving picture file. The moving picture file is generated by dividing the received moving picture data, based on camera control information.

20 Claims, 14 Drawing Sheets

(56) References Cited

FOREIGN PATENT DOCUMENTS

| | | |
|---|---|---|
| JP | 2000-041206 A | 2/2000 |
| JP | 2001-218194 A | 8/2001 |
| JP | 2002-077879 A | 3/2002 |
| JP | 2002-084445 A | 3/2002 |
| JP | 2002-354443 A | 12/2002 |
| JP | 2003-037836 A | 2/2003 |
| JP | 2003-046464 A | 2/2003 |
| JP | 2003-108472 A | 4/2003 |

\* cited by examiner

CONTROL HISTORY
MANAGEMENT TABLE

| IDENTIFIER | CAMERA SERVER IDENTIFIER | TIME OF GENERATION | PTZ SEQUENCE |
|---|---|---|---|
| i-1 | 201.218.187.23:6513 | 2001oct10.10:23:15 | HZ15_30 |
| i | 201.218.187.23:6513 | 2001oct10.10:33:01 | S3_40 |
| i+1 | 201.218.187.23:6513 | 2001oct10.10:33:48 | S4_25P-10_20Z-15 |
| i+2 | 201.218.187.23:6513 | 2001oct10.10:35:06 | S3_15S4_40P-10_20 |
| i+3 | 150.122.43.154:6513 | 2001oct10.10:35:17 | H_3P10_1P5_1P5_1P5_1P5_1P5 |
| i+4 | 150.122.43.154:6513 | 2001oct10.10:35:39 | S4_10P-20_20 |
| i+5 | 150.122.43.154:6513 | 2001oct10.10:35:57 | H_5P-60_3P5_3P5_3P5 |

METHOD OF GENERATING MOVING PICTURE INFORMATION

BACKGROUND OF THE INVENTION

1. Field of the Invention

The present invention relates to a technique for using communications to distribute picture data, and more particularly to a technique for providing picture data and control information of a camera device or other such input device for a live picture.

2. Related Background Art (Live Picture Communications Systems)

There are distribution systems for distributing a captured live picture via the Internet, and providing instructions for settings, operations, etc. for a camera that serves as a picture capturing device.

In addition to providing picture distribution, these picture distribution systems and such can also provide camera controls such as pan, tilt, zoom, backlight corrections, etc. via a network.

Furthermore, the camera controls can also restrict areas to be captured. For example, a privileged user may be able to use all zoom functions provided to the camera, but a normal user may be limited to using only a portion of the zoom functions (e.g., the user may not be able to make complete use of a telescopic side). This may also apply with respect to the pan function and the tilt function.

(Third Generation Mobile Telephone Technology)

Third Generation (3G) mobile telephone technology service is now being provided. This mobile telephone service uses electromagnetic waves more efficiently, and has wide-bandwidth communication, than conventional mobile telephone service.

With Third Generation (3G) mobile telephone service, Internet accesses and other data communications are possible during telephone communication.

(MPEG-4 Codec)

Picture transmission and reception terminals have become more widespread. These range from personal information terminals (such as PDAs) and mobile telephone terminals which connect to mobile communication networks, to PCs which connect to broadband Internets. Due to the spread of these devices, in 1999, MPEG-4 was established by ISO as a moving picture compression encoding format. This format has high compression encoding efficiency covering a wide range of bit rates from several tens of Kpbs to several tens of Mbps, a strong resistance to transmission line errors in wireless and Internet-based communications, and other advantages.

(MPEG-4 Clip Techniques for Mobile Telephones)

Techniques have been offered for providing picture clips (picture files) to mobile telephone terminals.

In these services, the picture clip (picture file), which is encoded using MPEG-4 codec or the like, is downloaded from a server using a data communication function built into the mobile telephone terminal. After that, a decoder built into the same mobile telephone terminal is then used to display the picture on a screen of the mobile telephone terminal.

The data formats used for these picture clips conform to formats which have been adopted widely with the Internet, PC's, and the like. These include Microsoft's Advanced Streaming Format (ASF), ISO standard MP4 format (ISO/IEC 14496-1 Amd1 MPEG-4 system Version 2), and the like.

(Techniques for Associating Links and Commands with Picture Clips)

In formats such as Microsoft's Advanced Streaming Format (ASF) and Apple's QuickTime File Format, URL's and other hyperlink functions can be linked to the picture clip.

For example, the use of ASF makes it possible to define a "script command object". Within this object, a list can be made with link information that is set to synchronize with the timeline to be followed when regenerating the ASF file. Furthermore, as the name "script command object" indicates, the use of ASF also makes it possible to author scripts and other command information, not just link information.

KDDI's ezmovie specifications also include a function for adding text telops (subtitles) with hyperlink functions to the picture clips. KDDI's Synchronous Telop Mark-up Language (STML) is used as a language for writing telops. This function enables the user to link audio communication, mail transmissions, home page links, etc. to the picture clip.

SUMMARY OF THE INVENTION

The present invention advances the techniques described above, and has an object to provide a picture distribution system capable of handling a new terminal represented by the mobile telephone terminal described above.

In order to achieve this object, one embodiment of the present invention adopts a method of generating moving picture information to distribute to a terminal device, the method including:

receiving moving picture data taken by a camera, and control sequence information of operations performed by the camera;

generating a moving picture file from the received moving picture data;

incorporating, into the moving picture file, the control sequence information of the camera corresponding to the generated moving picture file, and information relating to an address of the camera; and distributing, to the terminal device, the moving picture file with the control sequence information of the camera and link information of the camera incorporated in the incorporating.

In another aspect, the present invention adopts a method of generating a moving picture file, the method including:

obtaining moving picture data taken by a camera, and information relating to the camera corresponding to moving picture data; and generating a moving picture file by dividing the moving picture data, based on information relating to the camera.

Additional objects and characteristics of the present invention will become clear from the following specification and the drawings.

DESCRIPTION OF THE PREFERRED EMBODIMENTS

Detailed explanations are given below regarding preferable embodiments of the present invention, with reference made to the attached drawings.

Embodiment 1

Embodiment 1 is explained with respect to an example in which a live picture is received from a camera server configured on a network, and this picture is converted for a mobile telephone terminal and then is transmitted.

Explanation is also given regarding a picture conversion server. This picture conversion server generates a picture clip which appropriately reflects camera control status information (i.e., pan, tilt, zoom, control rights, etc.) pertaining to the picture. More particularly, the picture conversion server of this embodiment is characterized in that it utilizes the camera control status information from the time when the picture clip is made to create the picture clip so that the current camera picture corresponding to the above-mentioned camera control status information can be viewed. Here, the "picture clip" refers to picture data accumulated during a given period of time.

The picture conversion server obtains the picture data from the camera server 101 in advance, and then generates the picture clip which can be regenerated on a standard picture viewer provided to the mobile telephone terminal. When this picture clip is generated, link information relating to the camera control information is incorporated into the picture clip. Based on the camera control information incorporated into the picture clip, the mobile telephone terminal user can control the camera corresponding to that picture clip to obtain real-time picture data.

Figure 1:
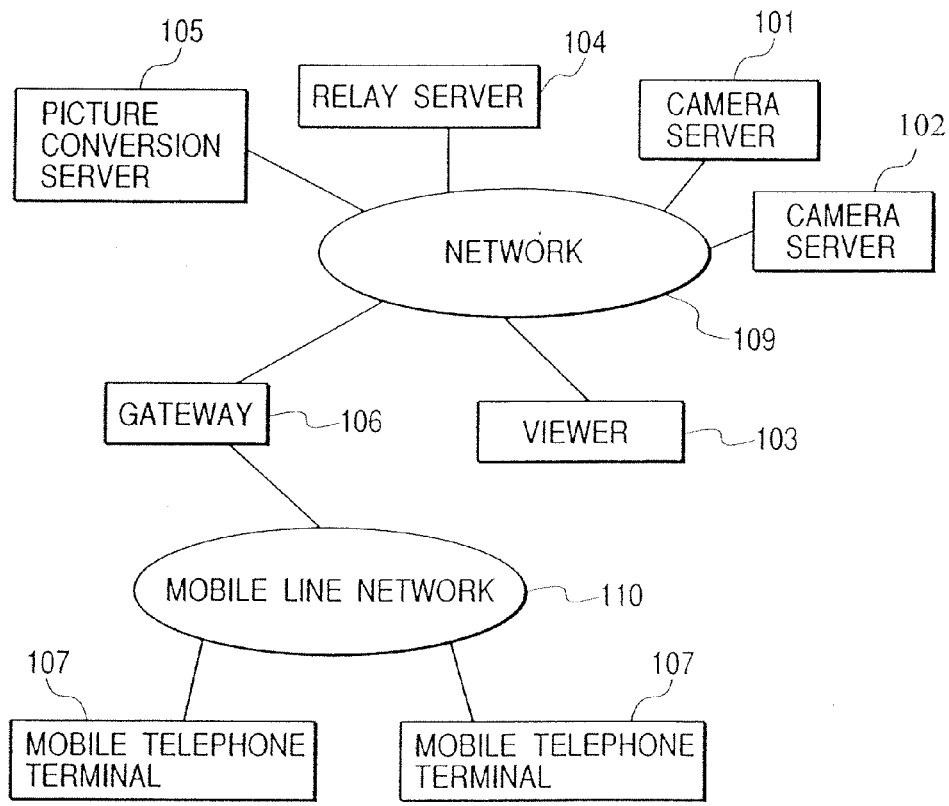
FIG. 1 is a diagram showing typical usage of an embodiment of the present invention.

FIG. 1 is a diagram showing typical usage of this embodiment. Camera servers 101, 102 have cameras and can perform live picture transmissions. The viewer 103 is a PC or the like, which is connected to a network. The camera servers 101, 102 and the viewer 103 are each connected to the network, and a request sent from the viewer 103 through the network 109 is sent to the camera servers 101, 102. When the request is received, the picture data is sent from the camera server to the viewer, and the camera picture can be displayed at the viewer 103. Furthermore, camera control commands can be sent from the viewer 103 to the camera servers 101, 102 to make the camera zoom, pan, tilt, etc. A relay server 104 is also arranged on the network 109 and relays communications between the viewer 103 and the camera servers 101, 102.

The picture conversion server 105 converts the picture data provided by the camera servers 101, 102 so as to be suitable for the mobile telephone terminal 107, and then transmits the picture data to the mobile telephone terminal. A gateway 106 mediates between the network 109 and a mobile line network 110. Application programs make the mobile telephone terminal 107 and the camera function as controllable viewers. The gateway 106 enables communications between the apparatus connected to the network of this embodiment and the mobile telephone terminals 107, 107. Typically, the application program on the mobile telephone terminal 107 is installed when shipped from the factory. However, the program may also be downloaded right before it is executed (used), such as a Java® program.

The network in FIG. 1 may be an intranet which is operated within a company or organization, or may also be the Internet connecting the entire world. Furthermore, the relay server and the picture conversion server are typically configured on an internet exchange (IX) or data center (IDC: Internet Data Center). This design alleviates communication loads.

Figure 2:
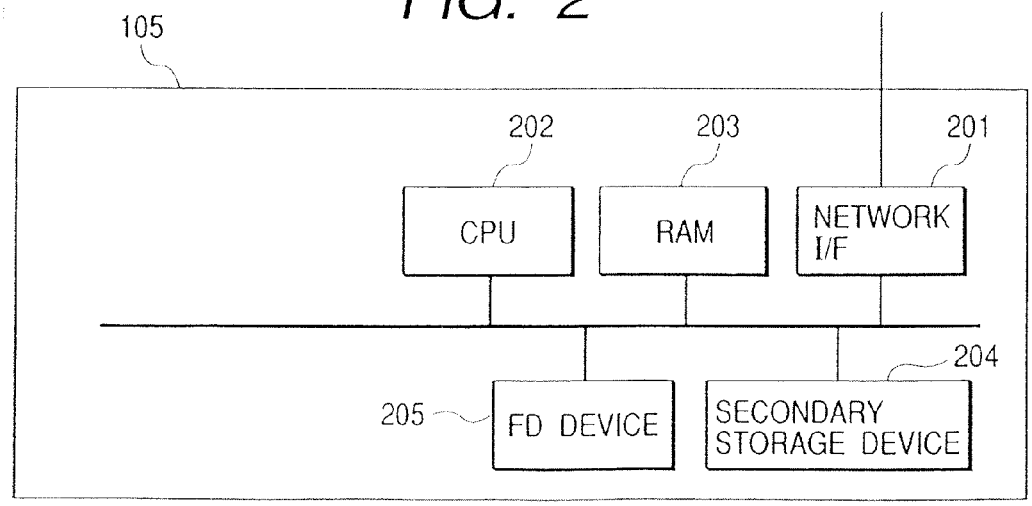
FIG. 2 is a diagram illustrating one example of a hardware construction for operating a picture conversion server.

FIG. 2 illustrates an example of a hardware construction for operating the picture conversion server 105. The picture conversion server 105 includes a CPU 202 for providing integrated control of the entire server based on a given program, and a network I/F 201 for connecting to the network 109. Storage devices include: a RAM 203 serving as a main storage device; a secondary storage device 204 such as a flash memory and a hard disk device; and a floppy disk device 205 for loading a program from a medium.

An input device may also be provided to perform settings and the like, but this is not shown in the diagrams. More specifically, this device could involve a display device for connecting a display, or a keyboard and mouse or other controllers.

Figure 3:
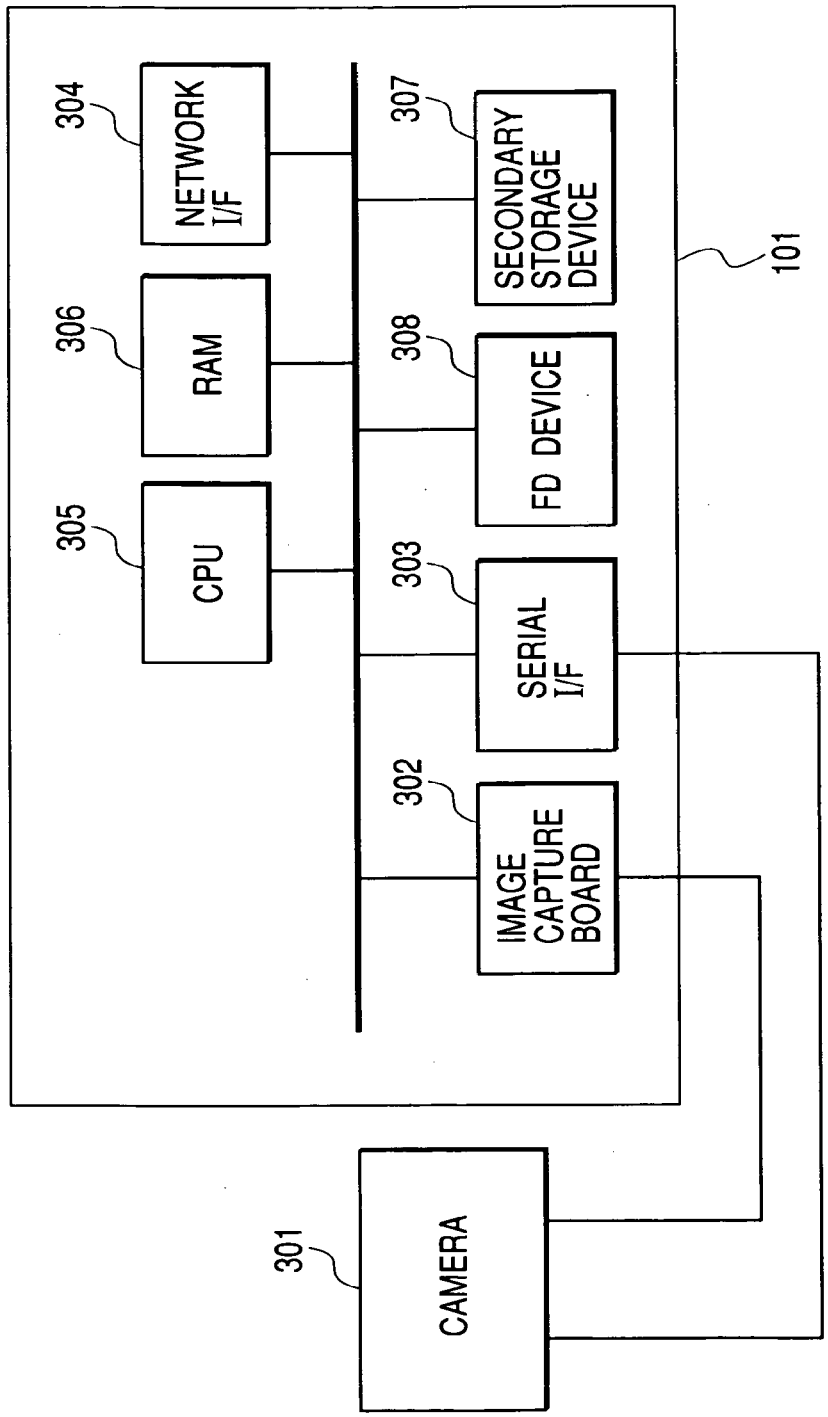
FIG. 3 is a diagram illustrating one example of a hardware construction used for a camera server.

FIG. 3 illustrates one example of a hardware construction used for the camera server 101. In actuality, this construction is constituted of a camera 301 for capturing pictures, and a computer. More specifically, this construction involves: a storage device for storing a program and data; a image capture board 302 for taking in the picture data; a serial I/F 303 for sending commands to the camera 302; a network I/F 304 for connecting to the network; a CPU 305 for performing various types of processing by means of programs; and other components. The storage device is constituted of: a RAM 306 serving as a main storage device; a secondary storage device 307 such as a flash memory and a hard disk device; and a floppy disk device 308 for loading the program from a medium. Multiple cameras 301 are provided and the user can switch the picture output as desired.

The camera server 101 may also be a network camera which is built into a server, so that the camera 301 and the computer are integrated in a single unit.

Figure 4:
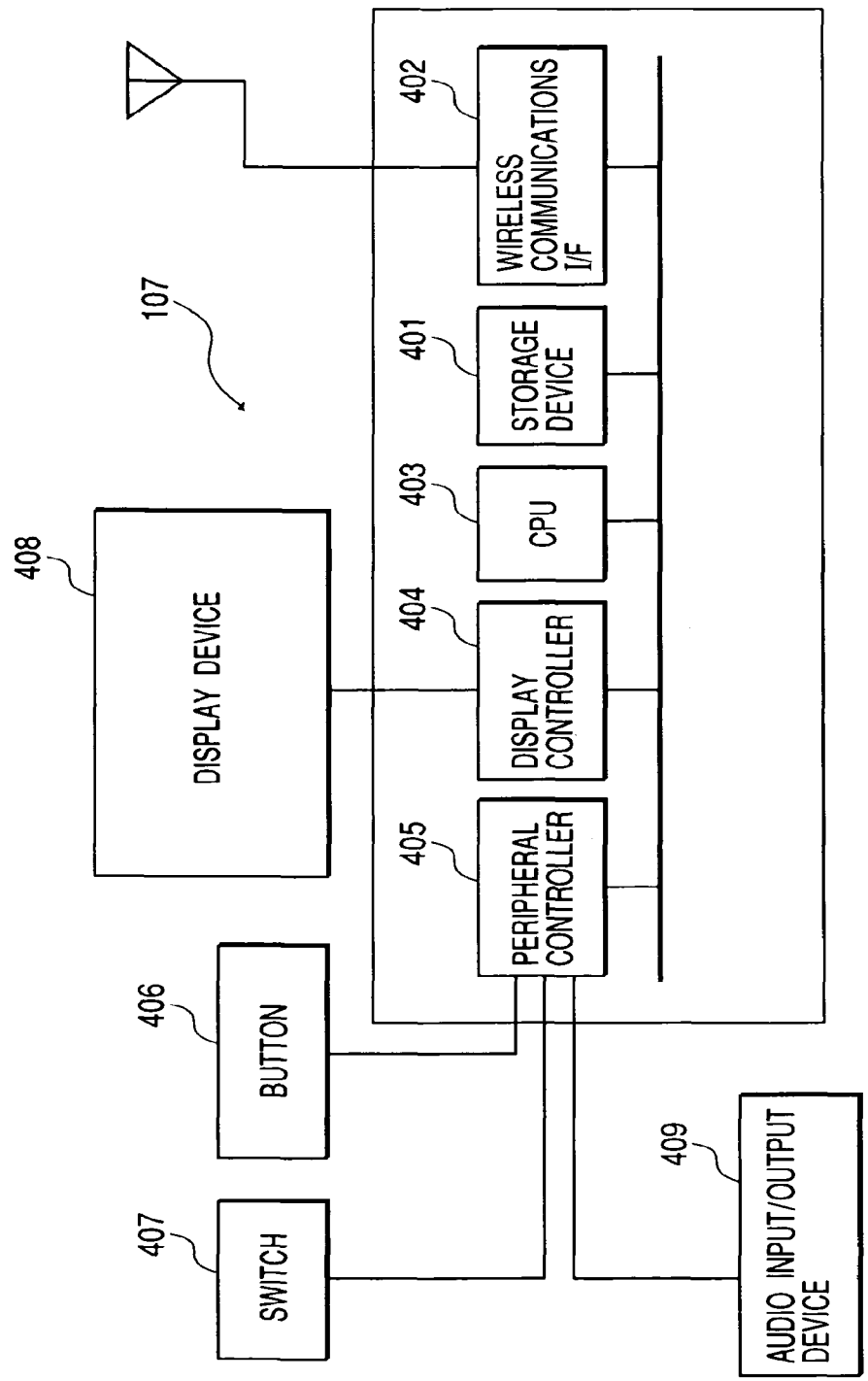
FIG. 4 is a diagram illustrating one example of a hardware construction for a mobile telephone terminal.

FIG. 4 illustrates an example of a hardware construction for operating the mobile telephone terminal 107. As described above, the mobile telephone terminal 107 is used and an application function operates to make it function as the viewer. More specifically, the mobile telephone terminal 107 includes: a storage device 401 for storing a program and data; a wireless communication I/F 402 for connecting with the mobile line network 110; a CPU 403 for executing various processes by means of programs; and peripheral devices. Examples of the storage device include a RAM serving as a main storage device and a flash memory. Examples of the peripheral devices include: an input device such as a group of buttons 406 or a group of switches 407 configured on the mobile telephone terminal 107; a display controller 407; a display output device including a display device 408; and an audio input/output device 409 such as a microphone and speaker.

Figure 5:
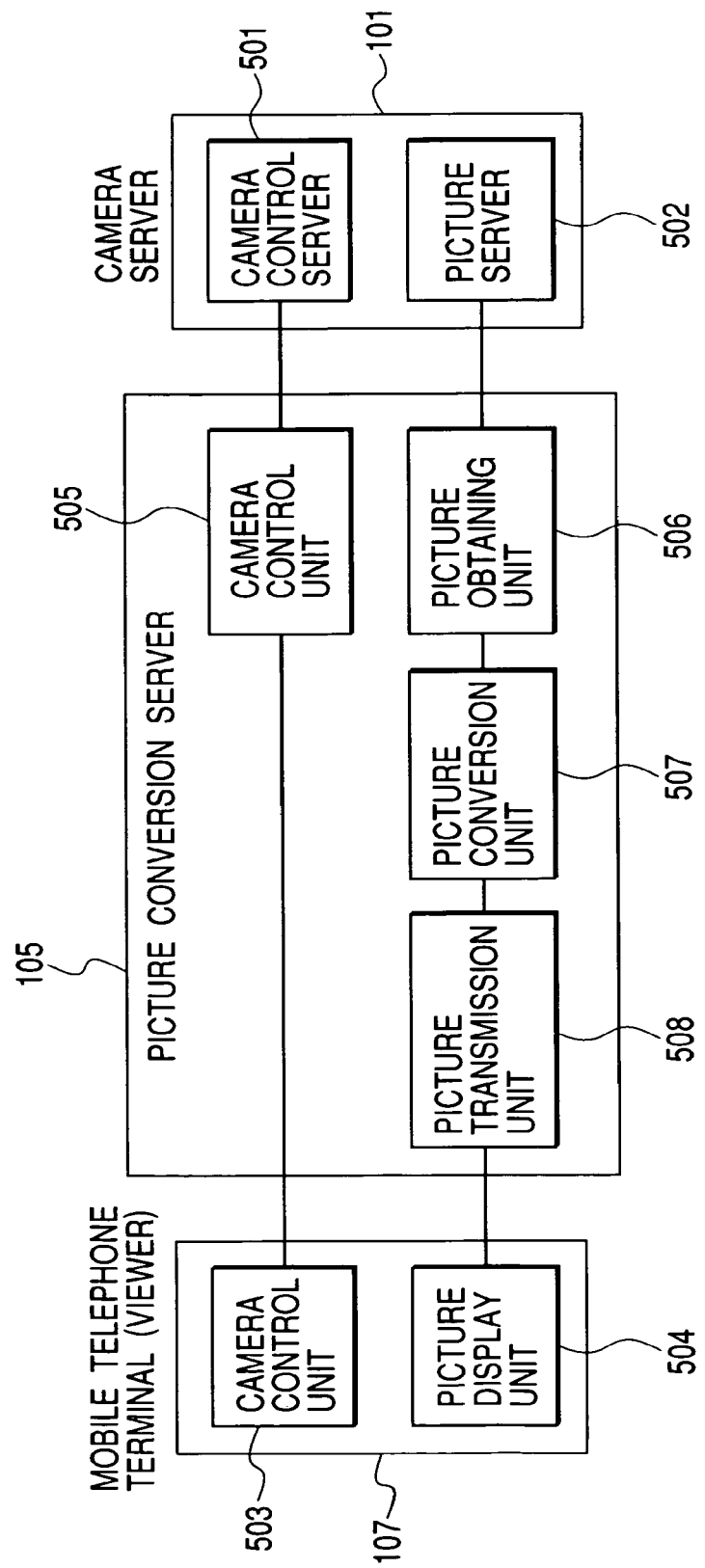
FIG. 5 is a diagram schematizing the operational processing programs of each of devices.

FIG. 5 is a diagram schematizing the operational processing programs of each of the devices. The camera server 101 includes 2 modules: a camera control server 501 for governing the camera controls, and a picture server 502 for governing the sending of the pictures. Similarly, an application program operating on the mobile telephone terminal 107 includes a camera control unit 503 for issuing camera control commands and responding to camera status notifications, and a picture display unit 504 for handling display of the picture clip. Furthermore, the picture conversion server 105 includes: a camera control unit 505 for interpreting a camera command control string (below, a "PTZ sequence"), and emitting the camera control command to the camera server 101; and modules (including a picture obtaining unit 505, a picture conversion unit 507, and a picture transmission unit 508) for obtaining the picture from the camera server 101, converting the picture from the mobile telephone terminal, and then editing this converted picture into a picture clip for the mobile line network 110.

Figure 6:
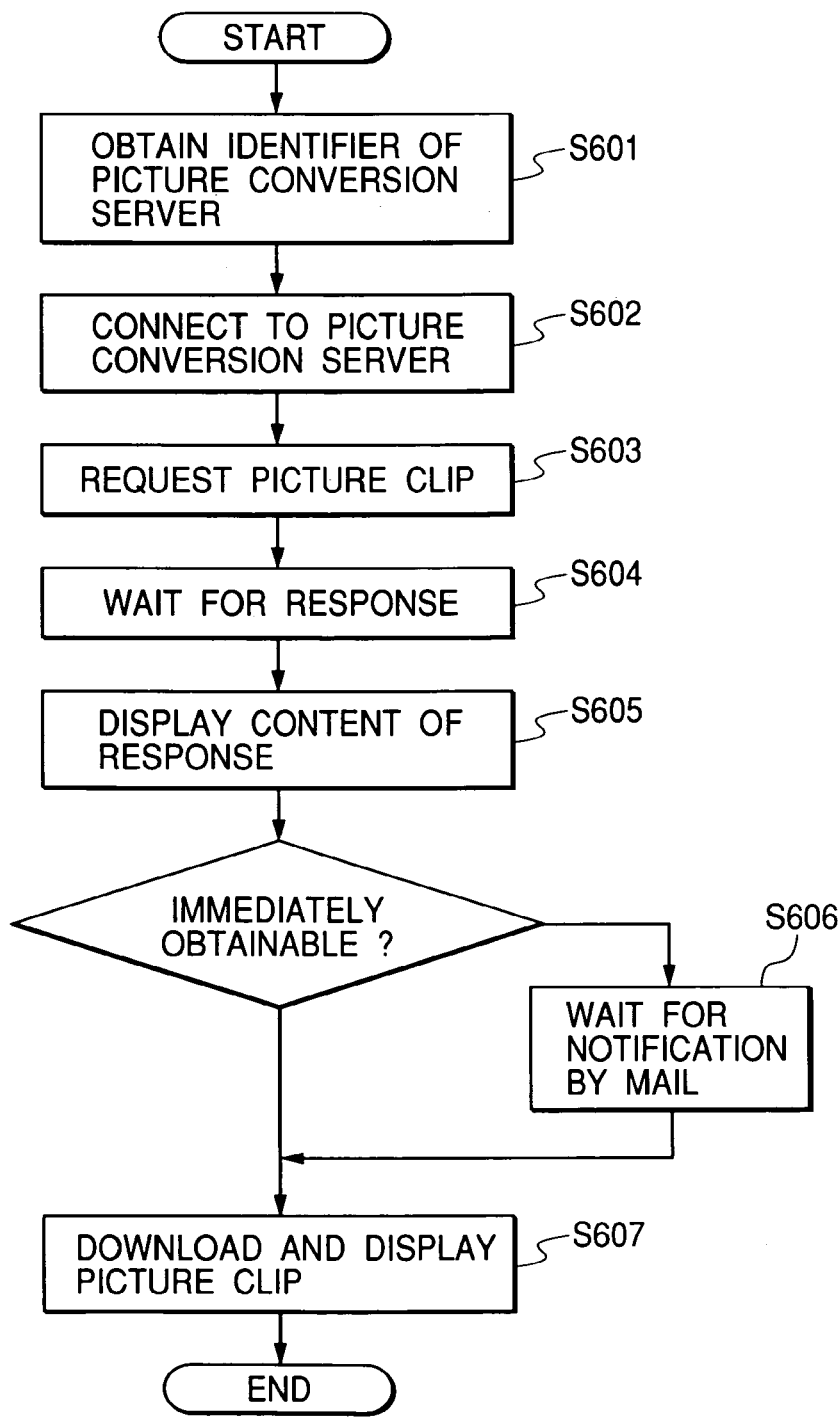
FIG. 6 is a flowchart showing operations of regenerating a picture on the mobile telephone terminal.

FIG. 6 is a diagram showing the flow of operations to regenerate and display the picture clip on the mobile telephone terminal 107.

First, at step S601, an identifier of the picture conversion server 105 is obtained. This may be an identifier which the user inputted directly by operating the keys, or may be an identifier which is selected from identifiers included in a mail or a web page. Typically, this identifier is a URL for distinguishing the picture conversion server 105.

Then, at step S602, based on the obtained identifier of the picture conversion server 105, a connection is established via the gateway 106 to the picture transmission unit 508 of the picture conversion server 105.

The picture conversion server 105 retrieves (from within itself) the identifier of the camera server 101 which the picture conversion server 105 should connect to, and the camera identifier. Then, from the mobile telephone terminal 107, the picture conversion server 105 obtains the PTZ sequence for the camera controls (pan, tilt, and zoom) for controlling the camera server 101, and a user identifier and password or other user identification information which is used for controlling access.

The camera server identifier and the PTZ sequence may be a camera control command input which the user inputted into the mobile telephone terminal 107 with direct key operations, or may be selected from camera server identifiers included in a mail or a web site or information relating to the PTZ sequence.

Then, at step S603, the mobile telephone terminal 107 requests the picture clip from the picture conversion server 105. This request includes instructions for generating the requested picture clip and the like. Typically, the request is sent according to HTTP protocol.

If information relating to the PTZ sequence has been obtained, the PTZ sequence information is then sent to the picture conversion server 105. The request and the transmission of the PTZ sequence information may be incorporated into the URL using the GET method for establishing HTTP connections or by using the POST method for establishing HTTP connections may also be used. Here, explanations are given for the case where the transmissions are performed using the POST method. The following is given as an example. (In actuality URL encoding is used; in order to facilitate explanations, there are portions where URL encoding is not used.)

```
POST/getvideoclip/HTTP/1.1
Host: 202.28.30.208:8080
User-Agent: MozilePhone/2.0 C2101V(c100)
Pragma: no-cache
videoencodeparam=QCIF:fps15.0:bps64000:intraframe5:me
8
cameraservers=webview://vb101_4.x-
zone.canon.co.jp:34560+34561+34562
PTZ=HZ15_30S3_40S4_40P-10_20
moviesizemax=240kbytes
notifyto=mailto:riyousha3@mailserver.co.jp
userid=331245
userpw=15215294
```

The portion following "videoencodeparam=" designates parameter information to be used when encoding for the mobile telephone terminal the source picture which the picture conversion server 105 received from the camera server 101. The portion following "cameraservers=" designates the camera server 101 for the picture conversion server 105 to connect to. The portion following "PTZ=" designates the information relating to the PTZ sequence with the commands for the camera controls which the picture conversion server 105 should execute for the camera server 101. The portion following "moviesizemax=" designates the maximum size of the data of the picture clip, as determined by the mobile telephone terminal 107 or by the mobile line network 110. The portion following "notifyto=" is a contact point where notification should be sent when the picture clip is generated. A mail address of the mobile telephone terminal 107 is typically indicated here. The portions following "userid=" and "userpw=" are the user identifier and password, respectively. The constitutive elements of the PTZ sequence have the following meanings. Below, n indicates numerical data (both positive and negative).

Pn Pan designation (horizontal camera control)
Tn Tilt designation (vertical camera control)
Zn Zoom designation
Bn Backlight correction,
  Turn backlight correction on/off
H Home position designation
Sn Preset position designation,
  Nth preset position
Cn Designation to switch camera server connection, Nth camera server
Kn Designation to switch cameras within same camera server,
  Nth camera
_n Time elapse designation. 0.1 second units.

Figure 7:
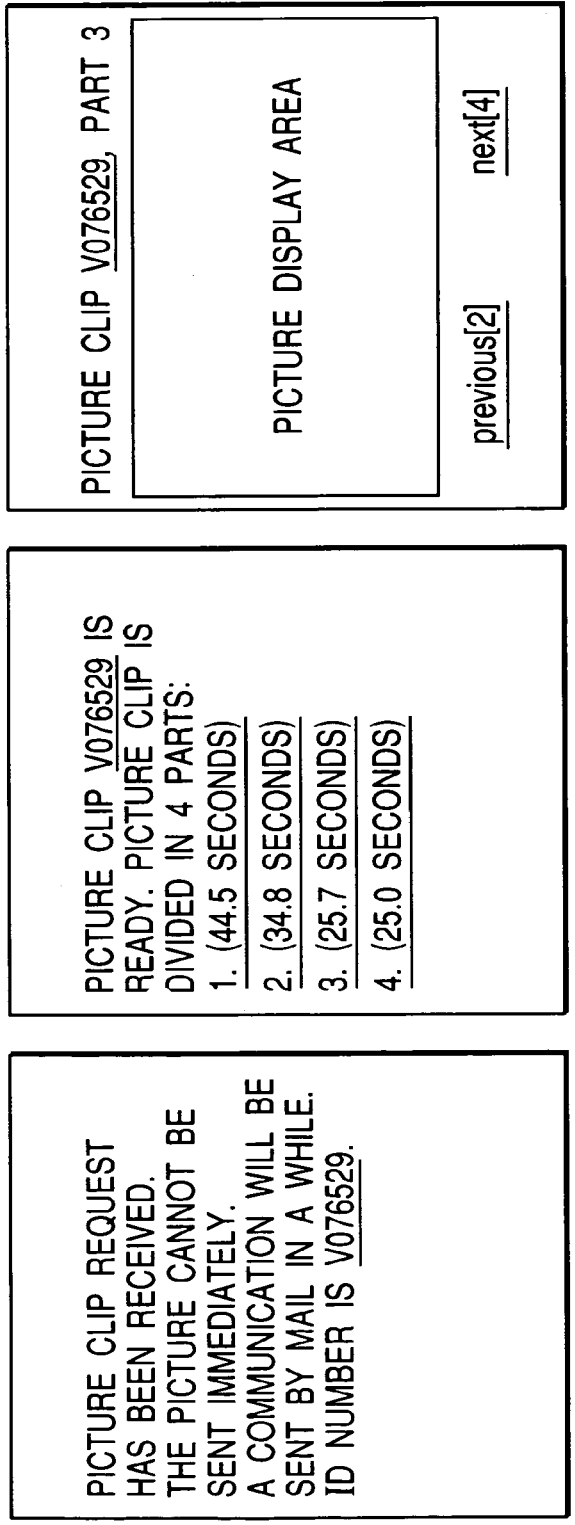
FIGS. 7A to 7C are diagrams showing one example of a display screen on a display device of the mobile telephone terminal.

Then at step S604, the system waits for a response from the picture conversion server 105. Then, at step S605, the response received from the picture conversion server 105 is interpreted and displayed on the display device of the mobile telephone terminal 107. See FIG. 7A for an example. If the response from the picture conversion server 105 indicates that for some reason the picture cannot be generated immediately, then the processing advances to step S606. Conversely, if it indicates that the picture could be generated immediately, then the processing advances to step S607.

At step S606, the system waits for a mail notification from the picture conversion server 105. The mail notification may be sent by Simple Mail Transfer Protocol (SMTP), for example. It may also be sent by Short Message Service (SMS). When the mail notification is received, the content of the mail is displayed as the response from the picture conversion server 105, and then the processing advances to step S607. See FIG. 7B for an example. At step S607, one of the picture clips included in the response is selected, downloaded and regenerated/displayed. See FIG. 7C for an example.

Here, the processing to regenerate/display the picture clip is executed after waiting for the downloading to finish. However, it is also possible to start the regeneration/display processing when sufficient picture data has been received to enable regeneration/display, without waiting for the downloading to finish.

If certain operations of the user operation buttons, which are provided to the mobile telephone terminal 107, are detected while the picture clip is being regenerated/displayed on the mobile telephone terminal 107, then the link information and the camera control information (PTZ sequence information) corresponding to the picture data (also called an "picture section" or "picture segment") that is being displayed at the time when these operations are detected is extracted from the picture clip.

Then, the browser function provided to the mobile telephone terminal 107 is used to access the link designated in the link information. Typically, when the link information is accessed, the application for enabling the camera controls is booted. The camera is then controlled to move in the directions in which the picture clip that is regenerated was captured, and pictures are captured as the camera moves in these direction. More specifically, the camera is time sequentially controlled to pan, tilt and zoom in the stated order based on the PTZ sequence information so as to correspond to the regenerated segment of the designated picture clip. These actions may also be performed according to settings that are configured in the mobile telephone terminal. In this case, for example; the accessed link information may be attached to a mail which is then transmitted.

Figure 8:
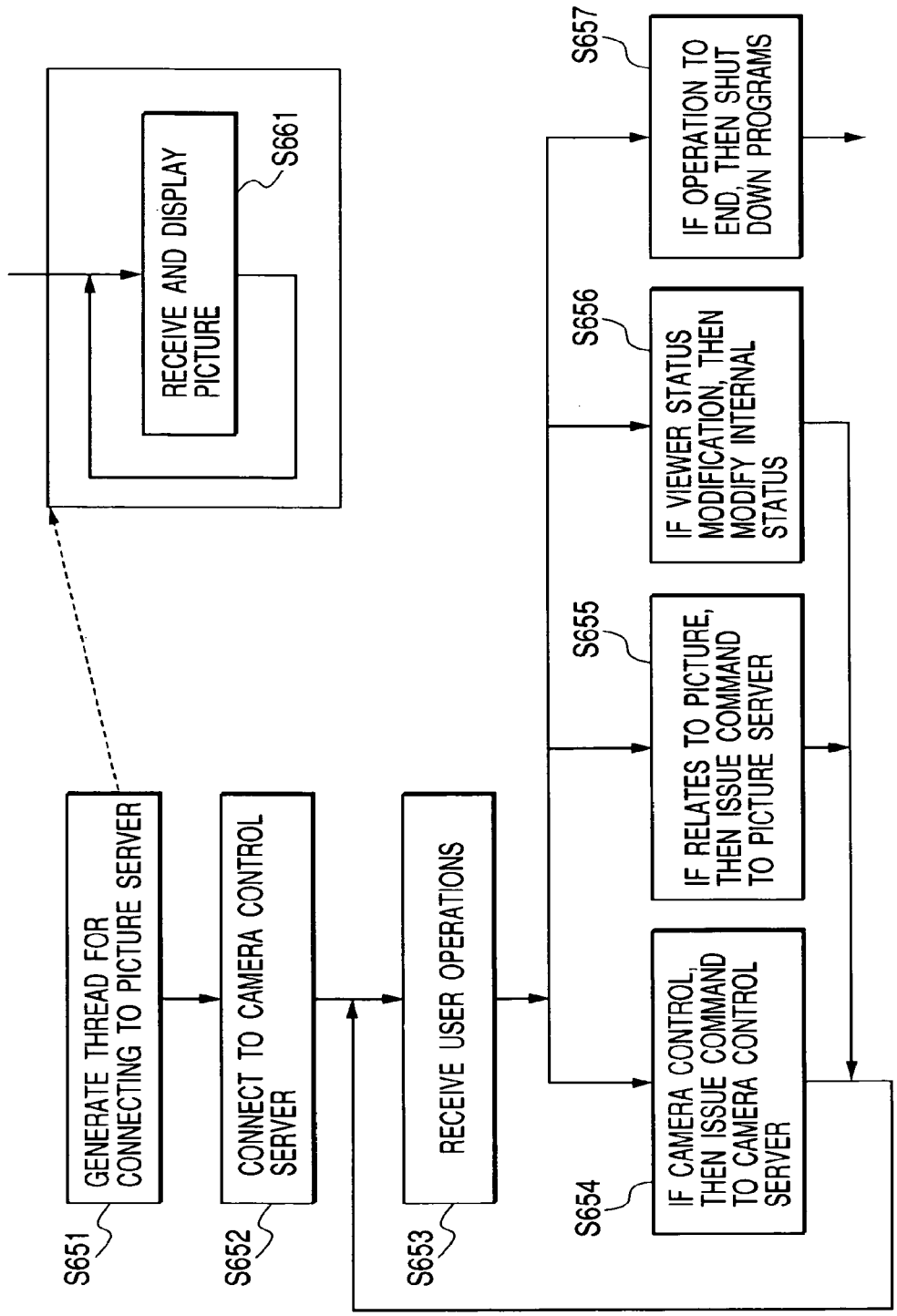
FIG. 8 is a flowchart showing processing for operations of a camera.

FIG. 8 is used to explain processing for the operations of the camera. First, at step S651 a connection is made to the picture server 502, according to the picture server 502 address and the connection port information inside the camera server 101 that was designated when the camera was activated. Here, an operations program (which can be achieved by loading a thread or a process) is loaded to perform the processing after the connection, and step S661 is repeated until the program finishes. At step S661, each time picture data arrives from the picture server 502, this picture data is received and displayed.

At step S652, a main program connects to the camera control server 501 based on the address and connection port information of the camera which was similarly designated at the time when the camera was activated.

In the main program that follows, an operation request is received from the user and then the procedure continues to a main loop of operations which it executes. First, at step S653 the operation performed by the user is detected. If the user's operation relates to the camera control, then at step S654 a command is issued to the camera control server 501. If the user command relates to the picture server 502, then at step S655 a command is issued to the picture server 502.

If the user's operation is to modify the picture display status (such as an operation to modify the display size or the like) then at step S656 the picture's display status is updated. If the user's operation is an operation to end the regeneration of the picture, then at step S657 each of the programs relating to the operation of the viewer is sequentially shut down. When this processing at S654-S657 ends, the procedure returns to S653 and waits for an operational input from the user.

The application for performing the camera operations, which runs on the mobile telephone terminal 107, may be installed as software that is included when the mobile telephone terminal is shipped. However, it may also be software which is downloaded from a network and then installed, like a Java® program.

FIG. 8 does not show a case where an operation is performed to switch the connection from one camera server to another camera server. Nor does it show a case where multiple cameras are connected to the camera server. In such cases, it is also possible to perform operations to switch the camera that obtains the pictures.

Figure 9:
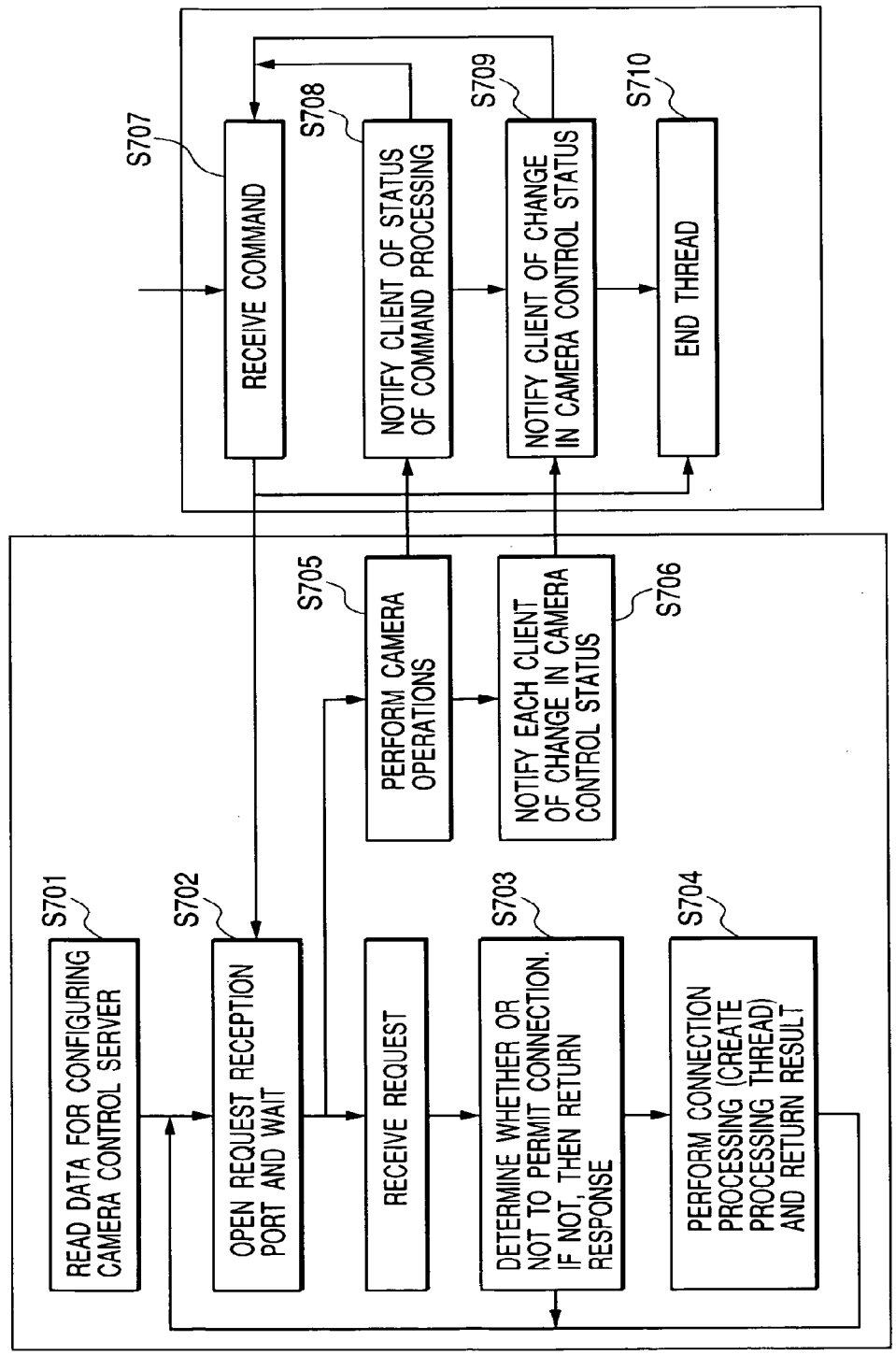
FIG. 9 is a flowchart showing operations relating to controlling of a camera inside the camera server.

FIG. 9 is a flowchart showing operations of the camera control server 501 inside the camera server 101. First, at step S701, when the system is booted, the camera control server 501 reads out information for configuring the operations of the camera control server 501 from a specific file (such as a registry or other database depending on the OS). Operations are then started based on this information. Here, the port to receive the request from the mobile telephone terminal 107 (which is the client) is opened via the picture conversion server 105. Then, this port enters a state where it is ready to receive the request at step S702.

Upon reception of the request (e.g., connection request, or operation command request), the procedure then leaves step S702. If the request is a connection request, then a judgment is made at step S703 as to whether or not to permit the connection. If the connection cannot be permitted, then an error code is returned to indicate that the connection was rejected, and then the procedure returns to step S702. If the connection is permitted, then at step S704 a thread is generated to perform reception processing (which serves as connection processing) to receive the commands from the mobile telephone terminal 107 or other client. After the client is registered, the processing then returns to step S702. The thread that was generated here is used at step S707 to receive the commands from the corresponding client.

When the command arrives it is received and passed to the main program for performing the camera operations. The main program receives this at step S702. The procedure then advances to step S705 and performs camera control in accordance with the authority of the client connected to the thread from which the operation command was issued. The result of performing this camera control (such as a code indicating whether the control succeeded or failed) is transmitted to the thread corresponding to the client that received the camera operations request. At step S708, the thread corresponding to this client sends the result back to the client. At step S706, the main program portion transmits the status change produced by the camera operation at step S706 (i.e., the camera status information including, for example, a pan, tilt, or zoom value and whether or not a prohibited area was detected, etc.) to all the threads corresponding to the client.

At Step S709, each thread corresponding to the client notifies the client of the camera control status change. When the thread corresponding to the client receives, from the client, the command to end the connection, the main program is then notified of this command, and then at step S710 that thread ends.

Figure 10:
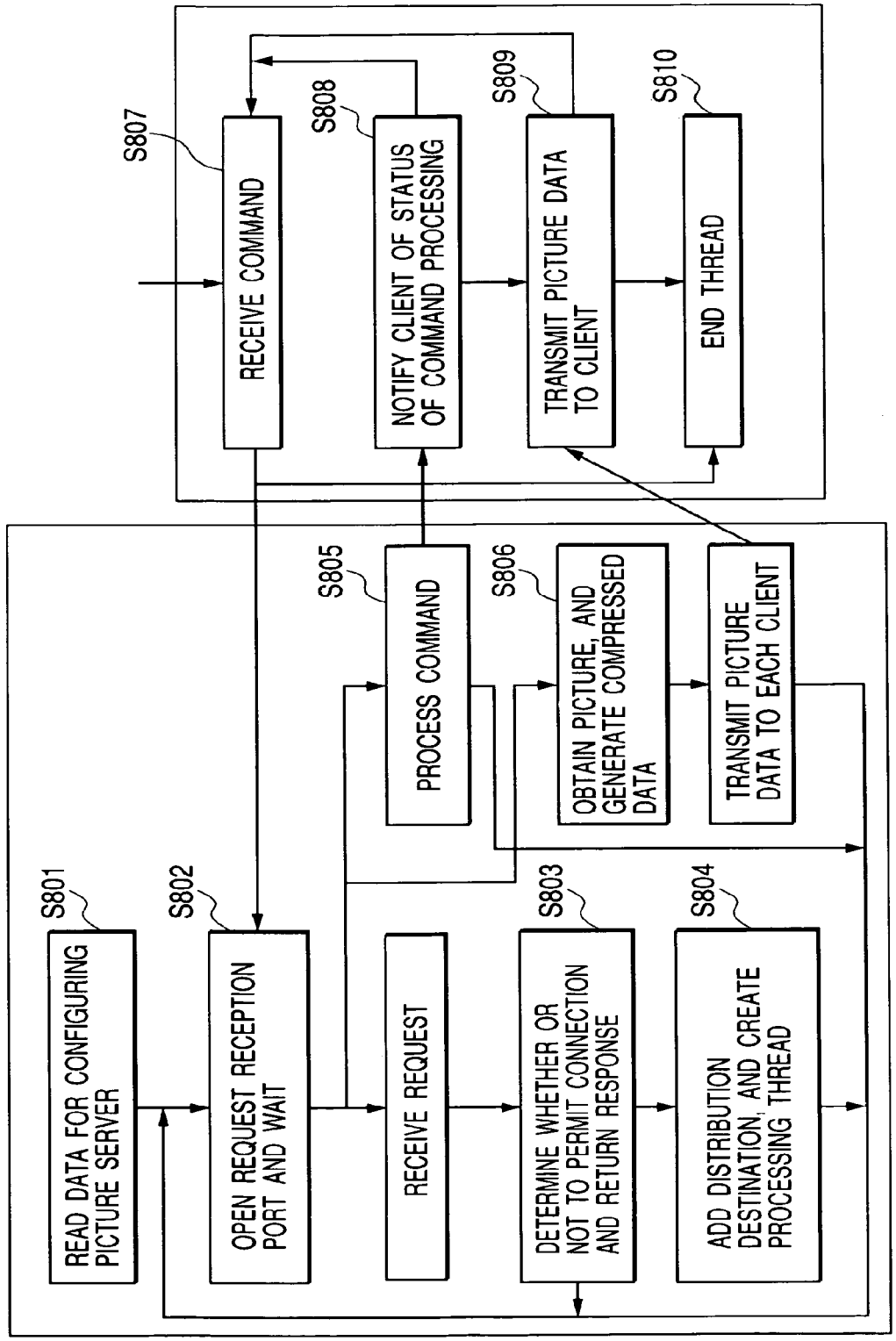
FIG. 10 is a flowchart showing operations relating to processing of the picture inside the camera server.

FIG. 10 is a flowchart showing operations of the picture control server 502 inside the camera server 101. First, at step S801, when the system is booted, the picture control server 502 reads out information for configuring the operations of the picture control server 502 from a specific file (such as a registry or other database depending on the OS). Operations are then started based on this information. Here, a thread for obtaining, encoding, and accumulating a picture is generated (this thread is initially in a resting state), and the port to receive the request from the mobile telephone terminal 107 (which is the client) is opened. Then, this port enters a state where it is ready to receive the request at step S802.

Upon reception of the request (e.g., connection request or command request), the procedure then leaves step S802. If the request is a connection request, then a judgment is made at step S803 as to whether or not to permit the connection. If the connection cannot be permitted, then an error code is returned to indicate that the connection was rejected, and then the procedure returns to step S802. If the connection is permitted, then at step S804 a session identifier is generated to identify sessions for respective clients. A thread for performing reception processing of commands from the client is generated, and the client is registered in accordance with an information on an access right etc. of the client who has issued a connection request. The processing then returns to step S802.

If the content of the request is a request for the live picture, and if the thread for obtaining and encoding the picture is in a resting state, then an instruction is giving for the resting thread to start operating before the processing returns to step S802. At step S807, the thread that was generated receives the command from the corresponding client. When the command arrives, it is received and then passed to the main program for performing the picture processing.

At step S802 the main program receives this command, and then the procedure advances to step S805. Operations are then performed to modify the settings for obtaining, encoding, transmitting, and other handling of the picture. The result of these operations (e.g., a code indicating whether these operations succeeded or failed) is then sent to the thread that corresponds to the client that received the command request. At step S808, the thread corresponding to the client sends this result back to the client.

At step S806, the main program portion uses the image capture board to obtain the picture data at pre-set time intervals, according to an instruction for starting operations which is given to the thread that will perform the picture capturing and encoding from step S804. This picture data is then converted into compressed data. This compressed data is then transmitted to the threads corresponding to all the clients connected to the live picture.

At step S809, the thread corresponding to each client determines whether or not there is a subsequent picture frame transmission request. If there is a request, then the picture data is sent to the client. If a prohibited area has been detected, then pre-registered client information is referenced. If the client is not registered, then the connection to that client is in a prohibited area. Therefore, a notification (i.e., a prohibited area detection notification) is sent to indicate that the compressed data will not be transmitted.

Then, if the thread corresponding to the client which is connected to the live picture receives the subsequent picture frame transmission request from the client, a picture frame transmission request flag is then set. (The subsequent picture frame transmission request is generally sent from the client after the client has completed the reception of the compressed picture data.)

If a command to terminate the connection is received from the client, then this command is sent to the main program, and then that thread is terminated at step S810.

Figure 11:
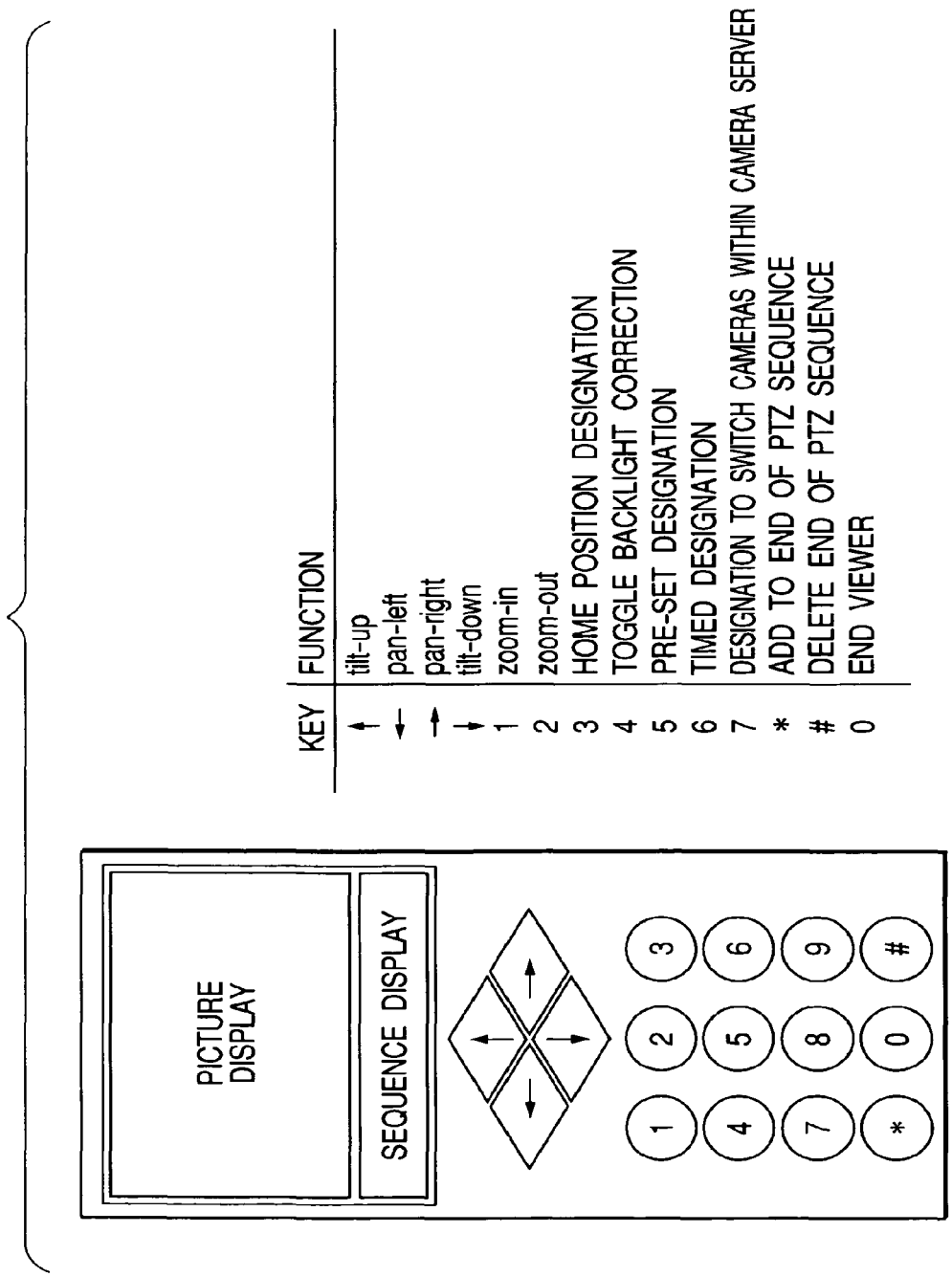
FIG. 11 is a diagram showing one example of assignment of operational keys on the mobile telephone terminal.

FIG. 11 is a diagram showing one example of assignment of operational keys on the mobile telephone terminal 107 which are used to create the PTZ control command. In order to create the PTZ sequence, the keys of the mobile telephone terminal 107 are assigned as shown in the diagram with functions to pan (i.e., horizontal movement of the camera), tilt (i.e., vertical movement of the camera), zoom (i.e., changes to increase magnification), perform backlight correction, and the like. The commands that are created are then sent via the picture conversion server 105 to the camera control server 501.

Figure 12:
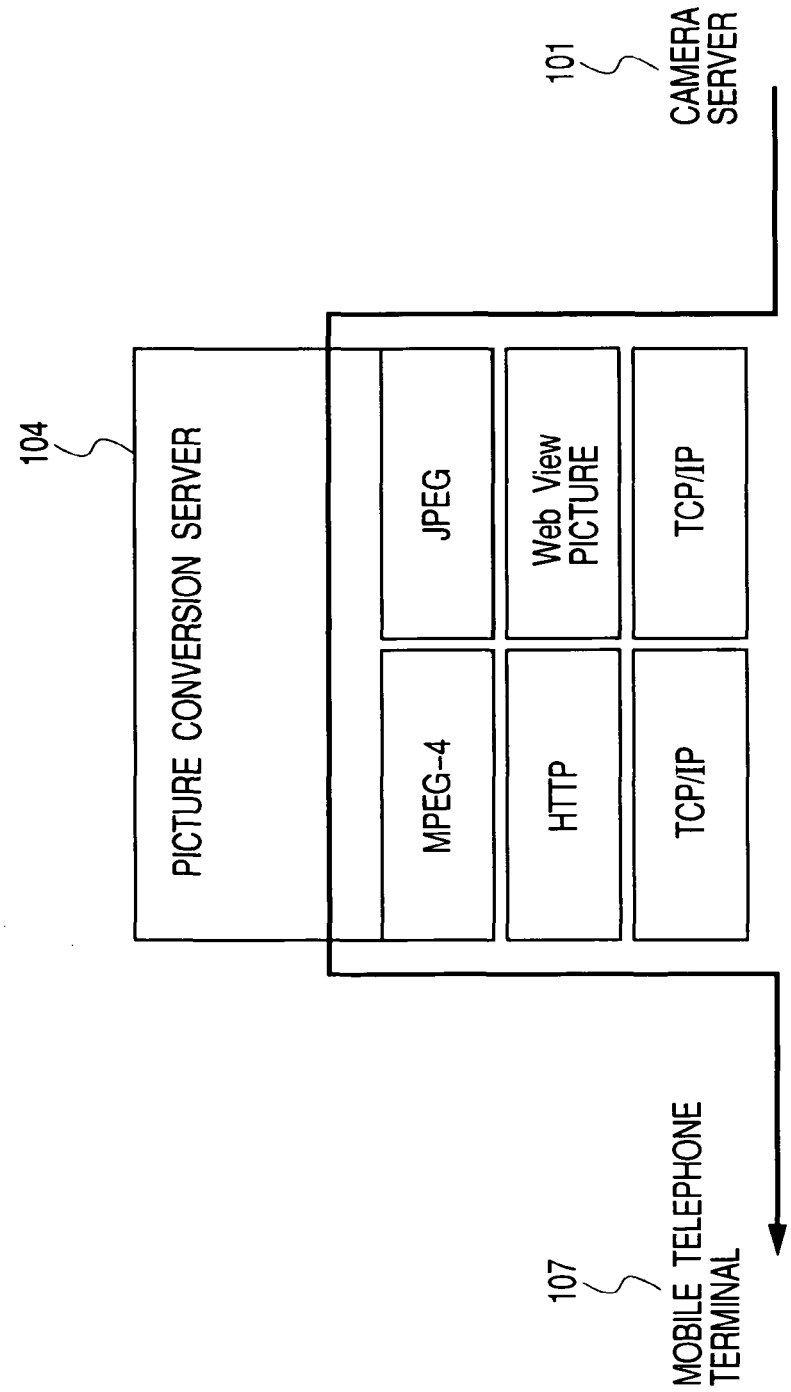
FIG. 12 is a diagram for explaining conversion of a picture data in the picture conversion server.

FIG. 12 is a diagram which schematically shows the general flow of the picture data in the picture conversion server 105. The picture data which is sent from the camera servers 101 (motion JPEG, QVGA-size 320×240) is received through a communications stack corresponding to the camera server of the picture conversion server 105, and then this data is passed on to a JPEG decoder. This data is then transferred over to an MPEG-4 encoder which is configured for mobile telephone terminals. After the data is turned into picture data for mobile telephone terminals (MPEG-4 simple profile, QCIF size 176×144, 64 Kbps) it is then sent as the picture clip to the mobile telephone terminal 107 via the communications stack corresponding to the mobile line network.

Figure 13:
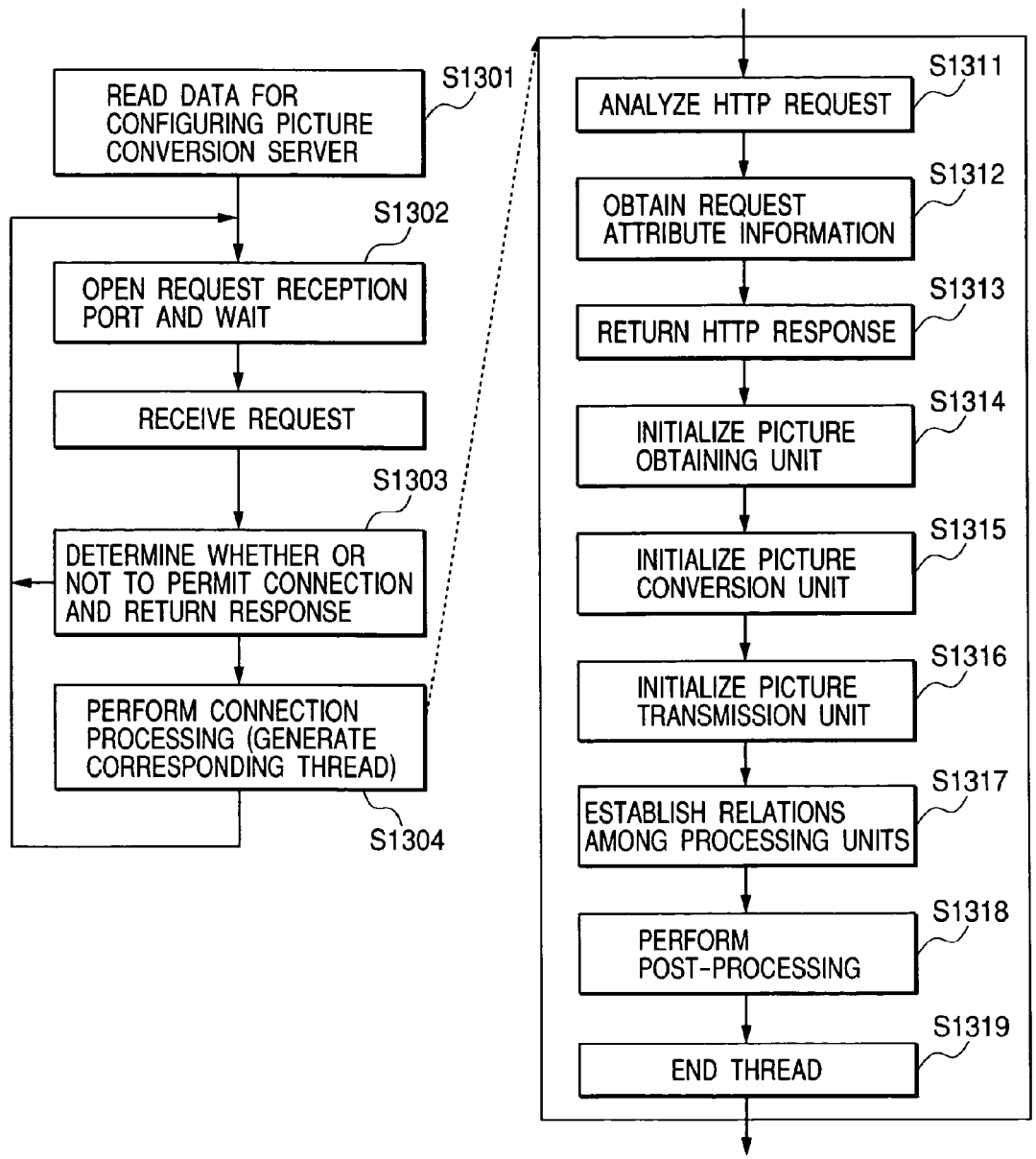
FIG. 13 is a flowchart showing processing for operations of the picture conversion server.

FIG. 13 is a flowchart showing operations of the picture conversion server 105.

First, at step S1301, upon activation, the picture conversion server 105 reads out the operation setting information for the picture conversion server 105 from a special file, and then operations are started based on this information. Here, the communications port for receiving the request from the application program running on the mobile telephone terminal 107 (which is the client) is opened, and then the picture conversion server 105 becomes ready to receive the request at step S1302.

When the request (i.e., HTTP request message or the like) has been received, the procedure then leaves step S1302. At step S1303, a determination is made as to whether or not to permit the connection. If the connection is not to be permitted, then an error code response is sent to indicate that the connection has been rejected, and then the procedure returns to step S1302. If the connection is to be allowed, then at step S1304 the threads corresponding to each client are generated for each client to perform transfer of information with the client as the connection processing. The client is then registered, and then the procedure returns to S1302.

At step S1311, the generated threads corresponding to each client then read the request from their corresponding clients and analyze the content of the request. Typically, the request is transferred to the picture conversion server 105 as an HTTP request. Sometimes the POST method is used to perform the HTTP request, and sometimes the GET method is used.

At step S1312, the following information is extracted from the content of the request: the encoding parameter information (i.e., picture conversion parameters); the information for connecting to the camera server 101 (i.e., the source picture information); the PTZ sequence information; the maximum size of the picture clip (i.e., the upper limit value of the picture clip); the notification destination information (i.e., the address to which the notification should be sent); and the user identification, password and other user identification information. These are indicated respectively as the values given for "videoencodeparam=", "cameraservers=", "PTZ=", "moviesizemax=", "notifyto=", "userid=", and "userpw=".

The picture conversion parameters include the selection of the codec for performing the conversion, parameters for the codec, data formats for inputting and outputting the codec, etc. The source picture information includes communication attribute information such as, for example, the network address and port number of the camera server 101 providing the live picture. Typically, the communications destination address is the mail address that designates the mobile telephone terminal 107 which is currently connected.

At step S1313, information is then sent as the HTTP response to the HTTP request. This information indicates that "The picture cannot be generated immediately. A communication will be sent by mail in a while."

At step S1314, the picture obtaining unit 506 is initialized in accordance with the source picture information and the user identification information. More specifically, a connection is established with the camera server 501 providing the source picture, and then obtaining of the source picture is begun.

The procedure then advances to step S1315, where the picture conversion unit is initialized in accordance with the picture conversion parameters. The picture conversion unit 507 includes the MPEG-4 encoder, etc. Then the procedure advances to step S1316 and the picture transmission unit is initialized. At this time, instructions indicating the maximum value of the picture clip and the address where the notification should be sent to are given to the picture transmission unit 508.

At step S1317, mutual relationships are established to send the processing data from the picture obtaining unit 506 to the picture conversion unit 507, and then from the picture conversion unit 507 to the picture transmission unit 508, respectively. Then, the camera control unit 505 transfers the PTZ sequence information to the camera control server 501, and then the camera control at the camera server 101 is executed.

At step S1318, the post-processing is then performed at the picture obtaining unit 506, the picture conversion unit 507, and the picture transmission unit 508. At step S1319, the thread for the client is ended.

Explanation is now given in sequence regarding the picture obtaining unit 506, the picture conversion unit 507, the picture transmission unit 508 and the camera control unit 505, which function inside the picture conversion server 105. First, the picture obtaining unit 506 performs processing to connect to the camera server 101 which provides the live picture. This processing is performed according to the source picture information and the user identification information received during initialization. Then, the picture data is obtained from the camera server 101 and receives a time stamp indicating the time it was obtained, and then the picture data is transferred to the picture conversion unit 507. The camera server 101 according to this embodiment provides the picture data in the Motion JPEG format. Therefore, the time stamp is applied to each of the individual units of JPEG data.

In the case where the notification indicating detection of the prohibited area has been received from the camera server 101, the prohibited area detection notification is sent to the picture conversion unit 507 instead of sending the picture data. Then, at the picture conversion unit 507, the MPEG-4 encoder is first configured with the codec parameters which were received during initialization, the codec input/output data formats, and the like.

The picture conversion unit 507 then arranges the source picture data received from the picture obtaining unit 506 so as to conform to the codec input data format and the picture size, and then this is inputted into the MPEG-4 encoder. The data resulting from this processing is then transferred to the picture transmission unit 508. Here, the picture conversion unit 507 according to the present invention pre-arranges the JPEG-format source picture data so as to conform with the QCIF size and YUV411 format, and then inputs this data into MPEG-4 codec. The MPEG-4 data thus generated (i.e., I-frame or P-frame) is then transferred to the picture transmission unit 508. At this time, the time stamp which was applied at the picture obtaining unit 506 is also inputted into the MPEG-4 codec together with the picture data.

In the case where the notification indicating detection of the prohibited area has been received from the picture obtaining unit 506, a composite screen which indicates that camera controls are limited in that area and the picture cannot be displayed, is inputted into the MPEG-4 codec instead of inputting the source picture data.

Next, the picture transmission unit 508 first secures a memory area equivalent to the maximum value of the picture clip, which was received during initialization. The picture data which the picture conversion unit 507 configured for the mobile telephone terminal is then received and saved in the memory area that was secured.

The picture transmission unit 508 then determines where to divide the picture clip. This determination is for a segment running from the point where the picture display prohibition detection notification was received, to a point where it was detected that the prohibited area has ended. The rate of usage of the memory area is also taken into consideration when determining where to divide the picture clip. Then, when the point to divide the picture clip has been determined, header information is placed conforming to the data format of the picture clip configured for the mobile telephone terminal. The picture data is then saved in the memory area as a file, and the memory area is reused. Accordingly, the picture clip is divided and saved into a plurality of files.

Explanation is now given regarding a method of determining where to divide the picture data when generating the picture clip in areas where picture display is not prohibited.

Figure 14:
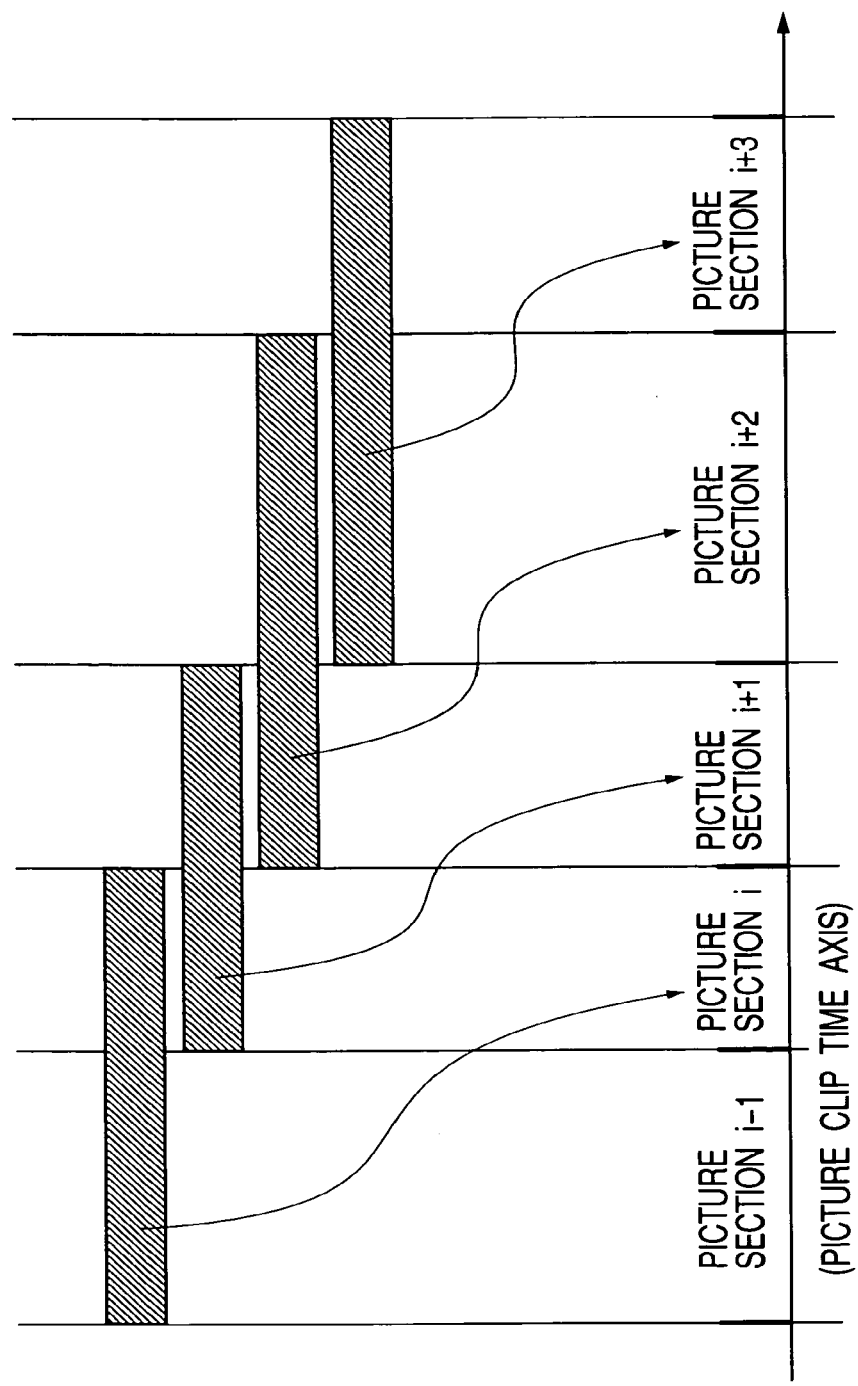
FIG. 14 is a diagram showing one example of control sequence data incorporated into a picture clip.

When the picture transmission unit 508 generates the picture clip, periodic calculations are made to determine priority levels for places to divide the picture clip. These periodic calculations may be made each time picture data is received, say, at one-second intervals. The calculations may be performed according to conditions (0)-(5), for example. As shown in FIG. 14, evaluation values can be obtained to indicate priority levels corresponding to points in time.

(0) "pri" represents the evaluation value for the priority level assigned to the immediately preceding picture data from the picture conversion unit 507. The initial value of pri is 0.

(1) The value of pri is raised by 3 in either of the following cases: when information is notified from the camera control unit 505 indicating picture data when the camera control information for the picture data are preset designations (including home position designations), or when a notification is received giving the instruction to change the camera server.

(2) The value of pri is raised by 2 when a notification is received from the camera control unit 505 with instructions for timing while changing cameras (within the same camera server).

(3) The value of pri is raised by 1 when notification is received from the camera control unit 505 with instructions indicating that the camera pan/tilt/zoom (PTZ) is intended for the pictures that are currently being processed.

(4) The value of pri is multiplied by 0.9 if there is no notification from the camera control unit 505.

(5) A priority level of "3" is assigned whenever the calculations produce a result greater than "3".

The evaluation values shown in FIG. 14 are arranged in predetermined intervals (e.g., 15-second intervals), and the picture clip is divided at the point where the evaluation value is the greatest. Thus the picture clip is generated.

The picture clip can also be divided according to another method. For example, information may be detected which indicates that the camera control information corresponding to the picture data is moving toward a preset position, or significant changes may be detected in the pan/tilt/zoom within a given duration of time (e.g., changes equal to 20% or more of the controllable range), and the picture clip can be divided at such points.

The picture transmission unit 508 receives the camera control status information that was obtained at the picture obtaining unit 506, and saves this information in chronological order. The camera control status information refers to information indicating when and how the camera was manipulated while capturing pictures. The camera control sequence (the PTZ sequence) information which corresponds to the camera control status information is generated from the camera control status information from a predetermined period of time. This PTZ sequence serves as a parameter for information which is incorporated into the picture clip as the link information.

Typically, the PTZ sequence which corresponds to the camera control status information is used as the parameter. Furthermore, in a case where the initial value of the PTZ sequence is designated, or when it matches with the preset position or a home position or the like, the absolute values of the pan, tilt, and zoom are incorporated into the picture clip as the link information.

As shown in FIG. 14, in this embodiment, duplicate camera control sequences are redundantly assigned to the link information for a given picture data section (picture segment).

The PTZ sequence may be constituted as the camera sequence information that is incorporated into the picture clip. This may include designations for multiple camera servers. However, the following type of PTZ sequence is also possible. (Here, the "Cn" included in the PTZ sequence indicates that the connection switches to the n$^{th}$ camera server.)

---
cameraservers=(webview://cam1.univ.ac.jp:34560+
34561+34562)(webview://cam2.univ.ac.jp:34560+34561+34
562)( webview://cam3.univ.ac.jp:34560+34561+34562)
PTZ=C1HZ15_30C2S3_40C3S4_40P-10_20
---

Furthermore, it is also possible to weave a designation for the camera server 1 into the PTZ sequence, for example, as shown below. (Here, the "C(x)" that is included in the PTZ sequence indicates that the connection switches to the camera server 1 indicated at x.)

---
cameraservers=
PTZ=C(webview://cam1.univ.ac.jp:34560+34561+345
62)HZ15_30C(webview://cam2.univ.ac.jp:34560+34561+345
62)S3_40C(webview://cam3.univ.ac.jp:34560+34561+34562
)S4_40P-10_20
---

Then, when a notification is received from the camera control unit 505 indicating that the PTZ sequence is finished, the remainder of the picture data that is being saved in the memory area is also saved as a file. After that, notification information to be sent to the mobile telephone terminal 107 is created. In this notification information is buried link information with links to the multiple picture clips which have been saved so far. The notification information is then sent to the address which indicates where the notification should be sent, which was received during initialization. Accordingly, the mobile telephone terminal 107 that received the notification information can now send the download request for each of the picture clips.

The picture transmission unit 508 has an HTTP server function and handles the HTTP picture clip download request from mobile telephone terminal 107.

Then, the camera control unit 505 interprets the PTZ sequence and creates the camera control command that will be sent to the camera server 101, and then the camera control command which is thus created is sent to the camera server 101 according to timing indicated in the PTZ sequence. This is how the camera server 101 camera control is performed. Then, upon finish of the PTZ sequence interpretation, notification is sent to the picture transmission unit 508 to indicate that the PTZ sequence is finished.

According to the construction described above, as to the mobile telephone terminal 107, the user regenerating the picture clip can use the camera control status information from the time when the picture clip was made owing to the function of the picture conversion server.

According to the foregoing explanations, the live picture sent from the camera server arranged on the network can be converted into the picture clip for the mobile telephone terminal and provided to the user. In particular, the picture conversion server of this embodiment is characterized by generating the picture clip that reflects the camera control status information of the camera server.

In accordance with this embodiment, the picture conversion server 105 divides the picture clip. However, the picture data and the information relating to the evaluation value of the priority level (see FIG. 14) can be sent to the mobile telephone terminal 107, and the mobile telephone terminal 107 can generate the picture clip.

This embodiment is explained using an example in which the picture conversion server is arranged on the network independently from the gateway which connects the mobile line network and the network. However, the picture conversion server 105 can also be arranged as one portion of the gateway 106. It is also easy to imagine a connection configuration in which the picture conversion server 105 and the gateway 106 are connected by a dedicated line, which could include a Virtual Private Network (VPN) or the like.

Furthermore, this embodiment is explained using an example in which the mobile telephone terminal 107 and the picture conversion server 105 communicate with each other by using HTTP. However, they may also communicate using Simple Mail Transfer Protocol (SMTP).

This embodiment was explained using an example in which the mobile telephone terminal where the camera control is performed, and the terminal which requests the picture clip, are the same terminal. However, the user who issues the camera control command may be a different user. For example, a configuration may be used in which the picture clip is accessed from a terminal to which the picture clip has been transferred once again. When this configuration is used, the application for controlling the camera becomes unnecessary.

This embodiment was explained using an example in which the link information containing the camera control sequence is generated at pre-set cycles and incorporated into the picture clip. However, the timing to generate the link information is not restricted to pre-set cycles. For example, the link information may be generated when changes in the camera control status information accumulate and reach a value which satisfies predetermined conditions. Alternatively, the link information may be generated when changes in the picture data itself (e.g., changes in the number of optically recognized objects) satisfy predetermined conditions.

Furthermore, the camera control sequence, which is generated at the picture transmission unit in this embodiment, is generated based on camera status information obtained from the picture obtaining unit. However, it may also be generated by cutting out a partial sequence from the PTZ sequence that is interpreted by the camera control unit.

When this method is used, it becomes possible to obtain the camera control sequence which is closer to that intended by the user who requested the creation of the picture clip. However, when the method includes a camera control for a prohibited area, for example, a camera control sequence will be generated which is not synchronized with the picture data. Thus, this method has advantages and disadvantages.

The picture transmission unit of this embodiment was explained using an example in which the camera control sequence during the adjacent picture data section is assigned to the link information for a given picture data section within the picture clip. However, the length (or time) of the assigned camera control sequence does not have to be dependent upon the chronological length of the picture data section. Typically, it is a fixed length (time) which is pre-set in the picture conversion server. Moreover, the length (time) of the assigned camera control sequence may also be dependent upon the occurrence of various events.

This embodiment was explained using an example in which the picture obtained from the camera server is converted into the picture clip suitable for the mobile telephone terminal and then is transmitted. There is no restriction as to the format of the picture clip. For example, when using Microsoft, Inc.'s Windows® MediaPlayer, in order to make the data correspond to MPEG-4 codec as well, when the picture transmission unit of this embodiment generates the picture clip, it can arrange the data in a data format conforming to Microsoft, Inc.'s ASF format. Moreover, within that format, the MPEG-4 codec can be designated so that the data can be regenerated in the Windows® MediaPlayer. Similarly, by arranging the data to conform to Apple, Inc.'s QuickTime File Format, the data can also be used with the QuickTime-Player as well.

Figures 15, 16:
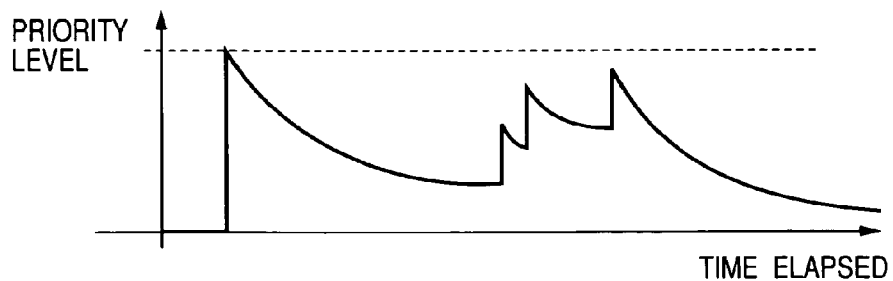
FIG. 15 is a diagram showing one example of a control history management table of a camera.
FIG. 16 is a graph showing one example of a relationship between a time elapsed and an evaluation value of a priority level.

It is also possible to perform the control of the camera by referencing a management table containing control information history, which is managed inside the picture conversion server 105. When the control is performed in this way, the picture conversion unit in Embodiment 2 first saves the camera status information received from the camera server 101 in chronological sequence, and then based on this information, the picture conversion unit then generates the camera control sequence (PTZ sequence) corresponding to the camera control status information. When performing this processing, the generated PTZ sequence is not incorporated into the picture clip directly as the link information. Instead of performing this processing, the generated PTZ sequence is stored into the control history management table of the camera inside the picture conversion server such as shown in FIG. 15, and then information reference in the control history management table is incorporated into the picture clip as the link information. Identifiers (i−1, i+1, . . . ) are assigned to entries in the control history management table, and these identifiers serve as the information referenced in the control history management table.

The assigned identifiers may be synthesized from a camera server identifier (typically an IP address) and an indication of the time at which the PTZ sequence was generated. Alternatively, the identifiers may be serial numbers, which are assigned sequentially.

In the case where the mobile telephone terminal 107 requests that the camera control information be referenced, the identifier serves as a key to search inside the control history management table, and then the camera control is performed based on the PTZ sequence that is thus found.

According to the construction described above, as the user of the mobile telephone terminal 107, the user regenerating the picture clip can use the camera control status information from the time when the picture clip was made. Furthermore, by referencing the control history management table, which is managed inside the picture conversion server, it also becomes possible to reference the camera control information from time frames adjacent to the time frame of the generated picture clip. By tracing the identifier (the information referenced in the control history management table) contained in the picture clip, the controls performed before and after the picture clip can also be obtained, like pulling up a string of potatoes, as it were.

A configuration is also possible in which the camera status information itself from the time frame in question is stored in the picture clip, and then based on that camera status information, the camera information is generated on the mobile telephone terminal 107 side, and then this serves as the control request for the camera 301 of the camera server 101. This configuration alleviates the burden on the picture conversion server 105.

The objectives of the present can also be achieved when the picture conversion server 105 and the camera server 101 are constructed as a single, integrated device.

What is claimed is:

1. An information processing apparatus which transmits picture data to one or a plurality of information terminals, the information processing apparatus comprising:
   a picture obtaining unit configured to obtain picture data from a picture capturing device;
   a processing unit configured to incorporate, to the picture data obtained by the picture obtaining unit, link information comprising a URL to be used by the one or the plurality of information terminals for starting a computer program which operates on the one or the plurality of information terminals and which controls the picture capturing device from which the picture data is obtained by the picture obtaining unit, wherein a destination of the link information is accessed by the one or the plurality of information terminals using a browser; and
   a picture transmitting unit configured to transmit the picture data, to which the link information has been incorporated by the processing unit, to the one or the plurality of information terminals.

2. The information processing apparatus according to claim 1, wherein the picture obtaining unit obtains status information of the picture capturing device, and
   wherein the processing unit generates the link information using control instruction data of the picture capturing device based on the status information as a parameter, and incorporates the generated link information to the picture data obtained by the picture obtaining unit.

3. The information processing apparatus according to claim 2, wherein the processing unit incorporates the link information using the control instruction data as the parameter to a partial section or a whole of the picture data.

4. The information processing apparatus according to claim 3, wherein the processing unit divides the picture data with a timing when a predetermined event occurs in the picture capturing device, links a plurality of picture sections in turn, and incorporates the link information using the control instruction data as the parameter to each picture section.

5. The information processing apparatus according to claim 4, wherein the processing unit links the plurality of picture sections in turn, by reflecting at least any one of a time of each picture section, priority of each picture section, and a relationship of each picture section.

6. The information processing apparatus according to claim 5, wherein the priority of each picture section and the relationship of each picture section are determined based on at least one of a frequency of controls to the picture capturing device, the number of controls to the picture capturing device, and a content of the occurred event in the picture capturing device.

7. The information processing apparatus according to claim 4, wherein the processing unit redundantly incorporates the link information using the control instruction data as the parameter to each picture section, so as to partially overlap the control instruction data to be incorporated to the adjacent picture section.

8. The information processing apparatus according to claim 1, wherein the link information includes information for designating the picture capturing device before and after changing a picture data obtaining destination.

9. An information processing method which is performed by an information processing apparatus which transmits picture data to one or a plurality of information terminals, the information processing method comprising:
   obtaining picture data from a picture capturing device;
   incorporating, to the obtained picture data, link information comprising a URL to be used by the one or the plurality of information terminals for starting a computer program which operates on the one or the plurality of information terminals and which controls the picture capturing device from which the picture data is obtained, wherein a destination of the link information is accessed by the one or the plurality of information terminals using a browser; and
   transmitting the picture data, to which the link information has been incorporated, to the one or the plurality of information terminals.

10. The information processing method according to claim 9, wherein the picture obtaining step obtains status information of the picture capturing device, and
   wherein the processing step generates the link information using control instruction data of the picture capturing device based on the status information as a parameter, and incorporates the generated link information to the picture data obtained by the picture obtaining unit.

11. A non-transitory storage medium which stores therein a computer-readable program for causing a computer which transmits picture data to one or a plurality of information terminals to execute a method comprising:
   an obtaining procedure to obtain picture data from a picture capturing device;
   a processing procedure to incorporate, to the picture data obtained in the obtaining procedure, link information comprising a URL to be used by the one or the plurality of information terminals for starting a computer program which operates on the one or the plurality of information terminals by and which controls the picture capturing device from which the picture data is obtained in the picture obtaining procedure, wherein a destination of the link information is accessed by the one or the plurality of information terminals using a browser; and
   a transmitting procedure to transmit the picture data, to which the link information was incorporated in the processing procedure, to the one or the plurality of information terminals.

12. A control apparatus for controlling an imaging apparatus, the control apparatus comprising:
   a receiving unit configured to receive video data captured by the imaging apparatus and incorporating link information comprising a URL for controlling the imaging apparatus which has captured the video data; and
   a controlling unit configured to access a destination of the link information using a browser, the controlling unit starting a computer program in the control apparatus based on the link information when accessing the destination of the link information for controlling the imaging apparatus from which the video data is obtained.

13. The control apparatus according to claim 12, wherein the video data received by the receiving unit further includes link information indicating how the imaging apparatus is controlled.

14. The control apparatus according to claim 12, wherein the video data received by the receiving unit further includes a plurality of sections each of which includes link information indicating how the imaging apparatus is controlled.

15. A control method by a control apparatus for controlling an imaging apparatus, the control method comprising:
   receiving video data captured by the imaging apparatus and incorporating link information comprising a URL for controlling the imaging apparatus which has captured the video data; and
   accessing a destination of the link information using a browser, starting a computer program in the control apparatus based on the link information when accessing the destination of the link information for controlling the imaging apparatus from which the video data is obtained.

16. The control method according to claim 15, wherein the video data received by the receiving step further includes link information indicating how the imaging apparatus is controlled.

17. The control method according to claim 15, wherein the video data received by the receiving step further includes a plurality of sections each of which includes link information indicating how the imaging apparatus is controlled.

18. A non-transitory storage medium which stores therein a computer-readable program for causing a computer which controls an imaging apparatus to execute a method comprising:
   a receiving procedure to receive video data captured by the imaging apparatus and incorporating link information comprising a URL for controlling the imaging apparatus which has captured the video data; and
   a controlling procedure to access a destination of the link information using a browser, the controlling procedure starting a computer program in the control apparatus based on the link information when accessing the destination of the link information for controlling the imaging apparatus from which the video data is obtained.

19. The storage medium according to claim 18, wherein the video data received by the receiving procedure further includes link information indicating how the imaging apparatus is controlled.

20. The storage medium according to claim 18, wherein the video data received by the receiving procedure further includes a plurality of sections each of which includes link information indicating how the imaging apparatus is controlled.

* * * * *